United States Patent

[15] 3,689,750

Esser

[45] Sept. 5, 1972

[54] PHASE-INDEPENDENT DIGITAL CORRELATOR FOR USE IN RADAR SYSTEMS

[72] Inventor: Leonard Jan Maria Esser, Emmasingel, Eindhoven, Netherlands

[73] Assignee: U.S. Philips Corporation, New York, N.Y.

[22] Filed: Dec. 14, 1970

[21] Appl. No.: 97,624

[30] Foreign Application Priority Data

Dec. 13, 1969 Netherlands............6,918,738

[52] U.S. Cl. .............235/181, 235/150.53, 235/156, 235/92 DM, 235/92 NT, 343/5 DP, 343/100 CL

[51] Int. Cl. ...........................G06f 15/34, G06g 7/18

[58] Field of Search......235/181, 156, 150.5, 150.51, 235/150.52, 150.53; 343/17.1, 17.5, 5, 5 DP, 100 CL

[56] References Cited

UNITED STATES PATENTS

| | | |
|---|---|---|
| 3,388,398 | 6/1968 | Kratzer et al.............343/17.5 |
| 3,514,585 | 5/1970 | Norsworthy...............235/181 |
| 3,553,722 | 1/1971 | Ott.........................235/181 X |

*Primary Examiner*—Felix D. Gruber
*Attorney*—Frank R. Trifari

[57] ABSTRACT

A phase independent digital correlator for use in radar systems comprising a signal input circuit, a multiplying stage, a plurality of combination devices, an integrating circuit, a plurality of threshold devices and a signal output circuit. The multiplying stage comprises at least one pair of 90° phase-shifted multipliers. The combination devices, coupled between the multipliers and the integrators, form linear combinations of the product signals produced by the multipliers. The threshold circuit comprises a plurality of inputs that are coupled to separate integrators.

4 Claims, 6 Drawing Figures

PHASE-INDEPENDENT DIGITAL CORRELATOR FOR USE IN RADAR SYSTEMS

The invention relates to a phase-independent correlator comprising in order of succession a signal input, a multiplying stage, an integrating stage, to which a threshold device is connected, and a signal output. The multiplying stage includes at least one pair of 90° phase-shifted multipliers, each of which is connected to the signal input and to at least one source of comparison signals.

Such an arrangement is shown in Dutch Pat. No. 6706096. In the digital embodiment of this arrangement the two binary output signals of the multiplying stage are directly applied to the individual counters. These counters count the difference between the number of "0" and "1" values of these binary signals. The states of the counters are a measure for the correction of the incoming signal by the comparison signals, one counter state being proportional to the sin $\phi$ and the other to cos $\phi$, wherein $\phi$ is a phase angle depending upon the phase of the incoming signal. In order to obtain a phase-independent output signal from the correlator, these counting results, as stated in said Patent Application, have to be further processed in the same manner as in the analogue embodiment in squaring devices and in an adder.

It is also known to determine the amplitude of an analogue signal of arbitrary phase but with projections given on two mutually perpendicular axes, by the formation of linear combinations of the projections. For this purpose, one of the projections is multiplied in a combination device by the values $\cos(2\pi i/n)$, where $i = 1,2 \ldots n$, and the other projection is multiplied by the values $\sin(2\pi i/n)$, where $i = 1,2 \ldots n$. These products are obtained with the aid of resistance networks constructed, for example, as potentiometers. By adjustment of the sliding contacts of the potentiometers the cosine and sine values by which the projections of the analogue signal are multiplied, are accurately obtained. Subsequently, the products formed by the multiplications of the projections by the cosine and sine values, containing the same index $i$, are summed in pairs in an adder, and in a threshold device the larger of these sum signals is determined. The value of the sum signal thus selected is a measure of the amplitude of the analogue signal.

The invention provides a novel concept of the production of a phase-independent output signal of a digital correlator.

The phase-independent correlator in accordance with the invention is characterized in that between the multiplying stage and the integrating stage, signal combination devices are provided for the formation of linear combinations of the product signals provided by the multipliers, each of these signal combination devices being connected to a separate integrator. The threshold device has a plurality of input and each integrator is connected to a separate input of the threshold device. The coefficients of the linear combination formed by the $i^{th}$ combination device ($i = 1,2 \ldots n$) are formed by integral numbers, which are the numerators of two fractions having equal denominators, said fractions being approximately $\cos 2\pi i/n$ and $\sin 2\pi i/n$ respectively. The threshold device has a threshold value at the corresponding $i^{th}$ input, which is equal to a constant value of all inputs multiplied by the denominator of said fractions.

This correlator has the advantage that it can be constructed from simple digital circuits.

The invention and its advantages will be described more fully with reference to embodiments shown in FIGS. 2–6.

Identical parts are designated in the various Figures by the same references.

Figure 1:
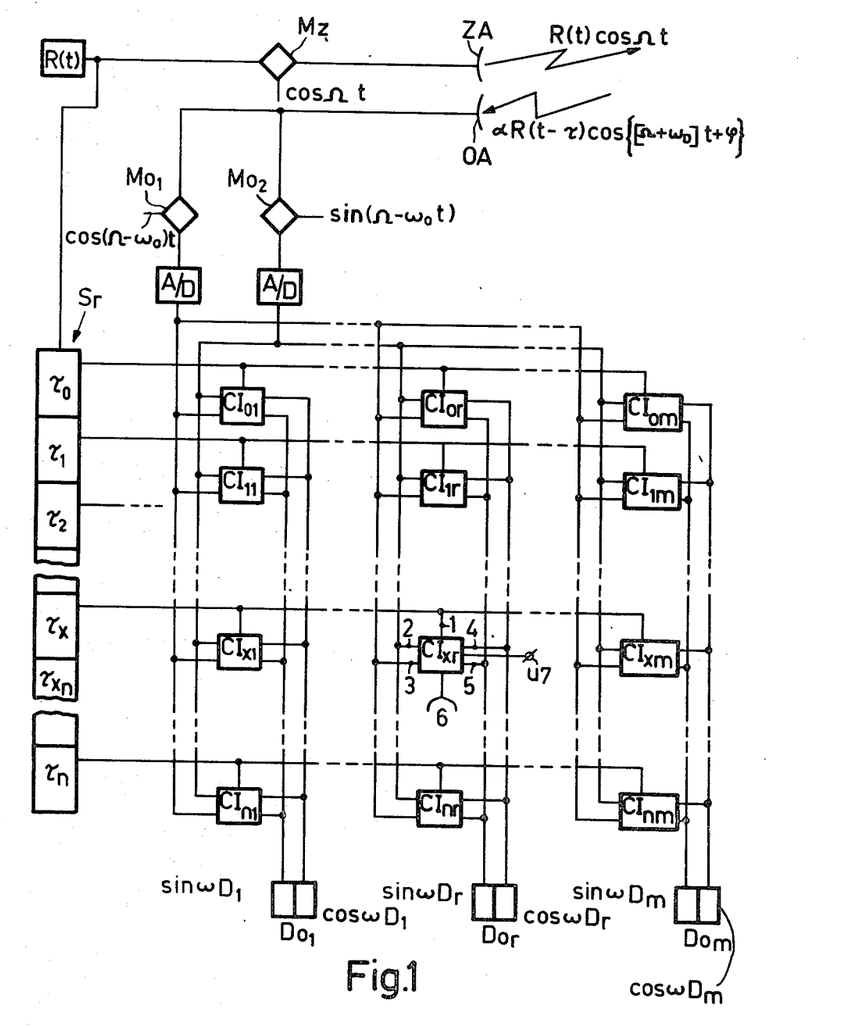
FIG. 1 shows a known correlation radar system.

FIG. 1 shows a known correlation radar system comprising a code generator $R(t)$. The output signal thereof is applied on the one hand to a shift register $S_r$, the outputs of which deliver the signal after a period of time $\tau_o, 2\tau_o, \ldots n\tau_o$, and on the other hand to a modulation stage MZ. To this modulation stage is also applied a high-frequency carrier $\cos \Omega t$, the phase of which is modulated in this modulation stage by the signal from the code generator $R(t)$. This phase-modulated signal is transmitted via the transmitter aerial ZA. A portion of the energy from reflections from objects at different distances and at different speeds is captured together with noise by the receiver aerial OA. The receiver has to be capable of selectively discriminating the energy originating from the reflection from an object of a given speed and a given distance. For this purpose the incoming signal is applied to two mixing stages $Mo_1$ and $Mo_2$. To the mixing stage $Mo_1$ is furthermore applied a signal $\cos(\Omega - \omega_o)t$ and to the mixing stage $Mo_2$ is applied a signal $\sin(\Omega - \omega_o)t$ Therein $\omega$ designates an artificial Doppler frequency, which serves to prevent the higher harmonics of the lowest potential Doppler frequencies in the signal from producing erroneous indications. The 90° phase-shifted signals are applied to analog-digital converters (AD), which convert the signals, for example, into pulse-width-modulated signals appearing at discrete instants.

Correlators are used as selective elements. The radar system comprises identical, multiple correlators CI in an array of rows and columns. The number of rows is determined by the distance intervals to be distinguished ($n$) and the number of columns is determined by the number of speed intervals to be distinguished ($m$). The numbers, $n, m$ are integral numbers and are determined as follows: if e.g. the radar device has a range of 100 miles and the distance intervals are chosen to be half a mile each, then $n = 200$, and if the speed range is 1,000 miles an hour and the speed intervals are chosen to be 5 miles an hour each, then $m = 200$.

For each speed interval a sine and a cosine generator Do with the required Doppler frequency $W_D$ are provided.

Six signals are applied to each of the correlators. For example, the correlator $CI_{-r}$ receives a signal from the code generator $R(t)$ with a time lag $x\tau_0$ by the shift register $S_R$ at the input terminal 1 and at the input terminals 2 and 3 the two pulse-width-modulated signals from the analog-digital converters (AD) and at the input terminals 4 and 5 the sine and cosine signals from the Doppler generator $Do_r$, which signals are clipped by means incorporated in the Doppler generators with a view to the digital processing in the correlator $CI_{xr}$. The terminals 6 receive pulse sequences having pulse repetition frequencies largely exceeding those of the discrete instants of the pulse-width modulation, said sequences being used for controlling the correlators. A pulse width modulated signal can be transformed into a pulse number modulated signal by scanning the pulse-width modulated signal at regular times to generate a pulse every time as the pulse-width modulated signal has a high value at a scanning time. The number of generated pulses in the repetition time of the pulse-width modulated signal is a measure of the pulse-width. To obtain an accurate transformation the scanning frequency must be several times higher than the pulse repetition time (discrete instants) of the pulse-width modulation. Before further explaining the correlators it should be noted that analog signals may also be applied to the correlators and that the analog-digital conversion may be performed in the correlator.

Figure 2:
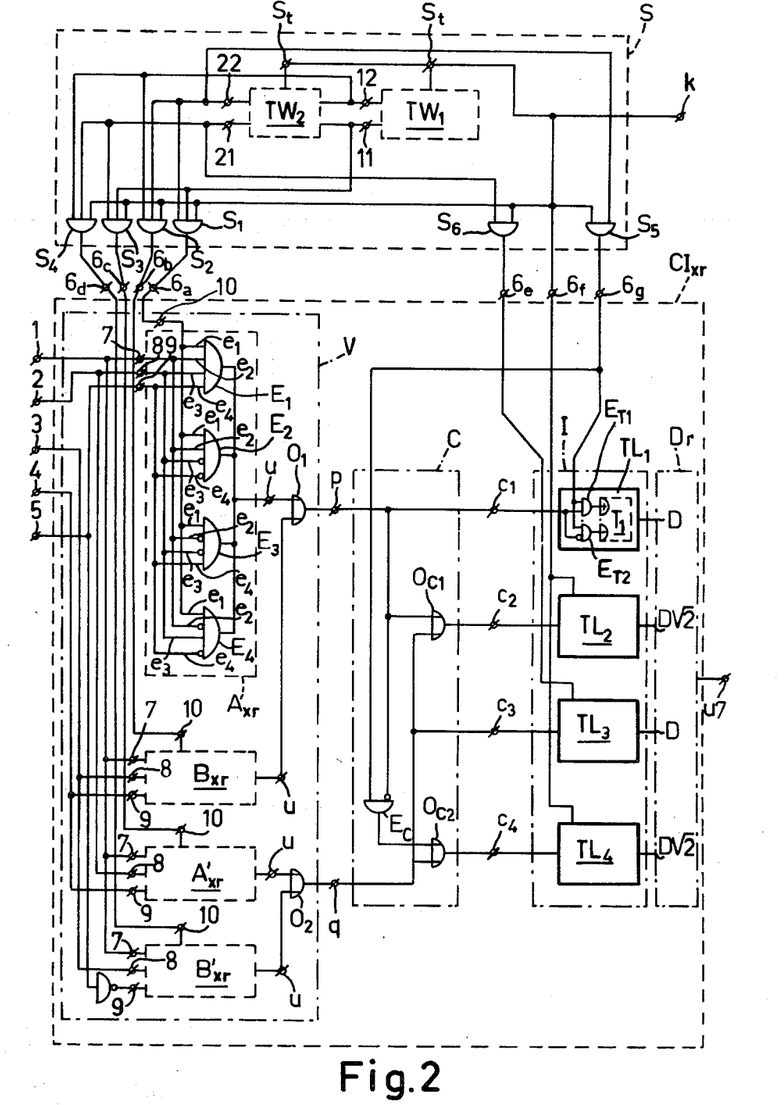
FIG. 2 shows a first embodiment of the correlator embodying the invention for use in the radar system of FIG. 1.

FIG. 2 shows the correlator $CI_{xr}$ of the matrix of identical correlators of the radar system illustrated in FIG. 1.

The correlator $CI_{xr}$ comprises a known multiplying stage V, a combination stage C, an integrating stage I and a threshold device Dr. The Figure, moreover, shows a control-stage S, which controls the correlator $CI_{xr}$ and which is common to a plurality of correlators. The multiplying stage represented by the block V comprises four identical multipliers represented by blocks $A_{xr}$, $B_{xr}$, $A'_{xr}$ and $B'_{xr}$. The circuitry of block $A_{xr}$ comprises four and-gates $E_1$ to $E_4$, each having four input terminals $e_1$ to $e_4$. Inverters (represented by circles in the Figure) are connected between the terminals $e_3$ and $e_4$ of the and-gate $E_2$ and the terminals of the and-gate $E_2$, between the terminals $e_2$ and $e_3$ of the and-gate $E_3$ and the terminals of the and-gate $E_3$ and between the terminals $e_2$ and $e_4$ of the and-gate $E_4$ and the terminals of the and-gate $E_4$. The terminals $e_1$ of all and-gates are connected to each other and to an input terminal operating as a connecting terminal 10 of the block $A_{xr}$. Likewise the terminals $e_2$, $e_3$ and $e_4$ are connected to the connecting terminals 7, 8 and 9. The connecting terminals 7 of the multiplying blocks are connected to each other and to terminal 1 of the correlator $CI_{xr}$. The connecting terminals 8 of the blocks $A_{xr}$ and $A'_{xr}$ are connected to each other and to the connecting terminal 2 of the correlator $CI_{xr}$. The connecting terminals 8 of the blocks $B_{xr}$ and $B'_{xr}$ are connected to each other and to the connecting terminal 3 of the correlator $CI_{xr}$. The connecting terminal 9 of the block $A_{xr}$ is connected through an inverter to the connecting terminal 9 of block $B'_{xr}$ and to the input terminal 5 of the correlator $CI_{xr}$. The connecting terminals 9 of the blocks $A'_{xr}$ and $B_{xr}$ are connected to each other and to the input terminal 4 of the correlator $CI_{xr}$. The terminals 10 of the blocks $A_{xr}$ to $B'_{xr}$ are connected to the input terminals $6a$ to $6d$ of the correlator $CI_{xr}$. The outputs of the and-gates $E_1$ to $E_4$ of block $A_{xr}$ are connected to each other and to the output terminal U of block $A_{xr}$. The output terminals U of the blocks $A_{xr}$ and $B_{xr}$ are connected to the inputs of the or-gates $O_1$, the output terminal p of which may be considered to form the multiplying stage V. Likewise the output terminals u of the blocks $A'_{xr}$ and $B'_{xr}$ are connected to the inputs of an or-gate $O_2$, the output terminal q of which may be considered to form a second output terminal of the multiplying stage V.

The control-stage S comprises a first, synchronous divide-by-two circuit $TW_1$ having output terminals 11 and 12, to which a clock pulse in the form of a pulse sequence is applied via the control-terminal $St_1$, which is connected to the input terminal K. The output terminals 11 and 12 of the divide-by-two circuit $TW_1$ are connected to the inputs of a second synchronous divide-by-two circuit $TW_2$, the control-terminal $St_2$ of which is connected to the input terminal K, said circuit having output terminals 21 and 22. The control-stage S comprises furthermore six and-gates $S_1$ to $S_6$. The input terminal K of the control-stage, the output terminal 11 of the divide-by-two circuit $TW_1$ and the output terminal 22 of the divide-by-two circuit $TW_2$ are connected via separate input terminals to the gate $S_1$. The input terminal K of the control stage and the output terminals 12 and 22 are connected to separate input terminals of the gate $S_2$. The input terminal K of the control-stage and the output terminals 11 and 21 are connected to separate input terminals of the gate $S_3$. The input terminal K of the control-stage and the output terminal 21 and the output terminal 12 are connected to separate input terminals of the gate $S_4$. The output terminals of the and-gates $S_1$ to $S_4$ are connected to the input terminals $6a$ to $6d$. The control-stage supplies pulses to these input terminals, i.e. the first to the input terminal $6a$, the second to the input terminal $6b$, the third to the input terminal $6c$, the fourth to the input terminal $6d$ and the fifth to the input terminal $6a$ etc. These pulses are applied to the and-gates of the multipliers $A_{xr}$, $B_{xr}$, $A'_{xr}$ and $B'_{xr}$. In dependence upon the sign of the product signals in the multiplier formed from the signals applied to the terminals 1 to 5 of the correlator $CI_{xr}$ at the instant of application of a pulse via an input terminal 10 to 1 of the multipliers, this pulse is or is not delivered by the relevant multiplier at the output terminal u. The pulses appearing at the output terminals u of the multipliers are consecutive in time; in this case serial processing is contemplated. The pulses appearing at the output terminals $u_1$ and $u_2$ of the multipliers $A_{xr}$ and $B_{xr}$ are delivered via the or-gate $O_1$ at the output terminal p. Likewise the pulses appearing at the output terminals $u_3$ and $u_4$ of the multipliers $A'_{xr}$ and $B'_{xr}$ are delivered via the or-gate $O_2$ at the output terminal q. The signals appearing at these terminals are consequently formed by modulated pulse sequences $p_s$ and $q_s$ respectively, termed binary signals hereinafter.

The sum of the values "1" minus the sum of the values "0" of these binary signals is, after a given time (termed correlation time) a measure for the amplitude of the specific incoming signal originating from a reflection from an object located at a distance corresponding to the time lag $x\tau_0/2$ and having a speed corresponding to the Doppler frequency ($\omega_{or}-\omega_o$), multiplied by the cosine and the sine respectively of the phase angle $\phi$ depending upon the phase of the incoming signal.

Figure 3:
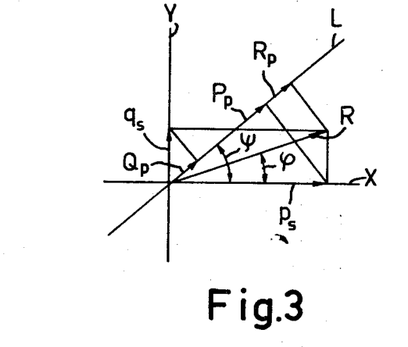
FIG. 3 is a vector diagram for explaining the operation of the correlation in accordance with the invention.

This is illustrated in the vector diagram of FIG. 3. The specific incoming signal R having a phase angle $\phi$ is decomposed along the $x$- and $y$-axes of a rectangular co-ordinate system into the components $p_s$ and $q_s$, which represent the binary signals at the terminals $p$ and $q$ of the multiplying stage V.

In the known arrangement the difference between the numbers of "1" and "0" values of the binary signals at the terminals $p$ and $q$ is continuously counted separately for each terminal and squared, the two square values being added to each other. The resultant numerical value is proportional to the amplitude of the specific incoming signal and hence proportional to the length of the vector R in the vector diagram of FIG. 3. Squaring and adding of digital signals are time-consuming and expensive processes. The invention has for its object to avoid squaring and to determine the amplitude of the specific incoming signal in a simple manner. The principle and operation of the correlators will be described more fully with reference to the vector diagram of FIG. 3.

The rectangular co-ordinate system comprises an axis L, going through the origin and being at an angle $\psi$ to the $x$-axis. The projection of $p_s$ on this axis is $P_p$ and equal to $p_s \cos\psi$ and the projection of $q_s$ on this axis is $Q_p$ and equal to $q_s \sin \psi$. The projection of R on this axis is $R_p$ and equal to $P_p + Q_p$, so that $R_p = p_s \cos \psi + q_s \sin \psi$ with $p_s = R \cos \psi$ and $q_s = R \sin \psi$ provides this $R_p = R \cos \psi - \psi$. By providing a plurality of axes being at equal angles to each other and by determining the projections of R on these axes and be assessing the projection of the greatest length the length of the vector $R$ is approached. With an $n$-axes system the maximum value of $(\psi-\psi) = \pi/(2n)$.

The maximum relative error is then $R - R_p/R = (1 - \cos \pi/2b)$. With a two-axes system this error is 29 percent, with a three-axes system this error is 13.4 percent, with a four-axes system it is 7.6 percent and with a six-axes system it is even not more than 3.4 percent.

The binary signal $p_s$ at the output terminal $p$ of the multiplying stage V has to be multiplied in accordance with the formula for $R_p$ in $n$ separate signal combination devices by the values of $\cos 2\pi j/n$ ($j = 1, \ldots n$). Likewise the binary signal $q_s$ has to be multiplied in these $n$ separate signal combination devices by the values of $\sin 2\pi j/n$. However, the sine and the cosine of real angles provide results lying between 0 and 1, which renders digital processing difficult. The invention obviates this difficulty by approaching $\sin (2\pi j/n)$ by $$\frac{v_j}{\sqrt{vu_j^2 - v_j^2}}$$

and the $\cos (2\pi j/n)$ by $$\frac{u_j}{\sqrt{vu_j^2 + v_j^2}}$$

wherein $u_j$ and $v_j$ are integers. The numbers of bits of the binary signals $p_s$ and $q_s$ are multiplied in the signal combination devices by $u_j$ and $v_j$ respectively. The resultant bit numbers from the signal combination devices are applied per signal combination device to the individual counters, which determine the difference between the numbers of "1" and "0" values of the bit numbers. However, these results are a factor $\sqrt{u_j^2 + v_j^2}$ higher. These counter positions are transferred to a threshold device, which assesses whether a given counter position (termed threshold value) is exceeded, after which an output signal is delivered for indicating the presence of an object in a given distance interval and inside a given speed interval. By choosing threshold values a factor $\sqrt{u_j^2 + v_j^2}$ higher than the counters which deliver a count that is also a factor $u_j^2 + v_j^2$ higher, these high counts are corrected in a simple manner.

The invention will be explained more fully with reference to a four-axes system illustrated in FIG. 5.

The multiplication factors of this four-axes system are indicated in Table A for the binary signals $p_s$ and $q_s$.

TABLE A

| $\psi$ | $\cos\psi$ | $\sin \psi$ | Mult. factor $p_s$ | Mult. factor $q_s$ | Threshold values |
|---|---|---|---|---|---|
| 0 | 1 | 0 | 1 | 0 | D |
| $\pi/4$ | $1/\sqrt{2}$ | $1/\sqrt{2}$ | 1 | 1 | $D\sqrt{2}$ |
| $\pi/2$ | 0 | 1 | 0 | 1 | D |
| $3\pi/4$ | $-1/\sqrt{2}$ | $1/\sqrt{2}$ | $-1$ | 1 | $D\sqrt{2}$ |

The first column indicates the angles between the four axes and the $x$-axis. Columns 2 and 3 indicate the desired exact multiplication factors for the binary signals $p_s$ and $q_s$. Columns 4 and 5 indicate the real multiplication factors and column 6 indicates the threshold values. Therefore the combination stage C of FIG. 2 is constructed as follows: the output terminals $p$ and $q$ of the multiplying stage V are connected to the input terminals of the combination stage C. For multiplying the binary signal $p_s$ by 1 and the binary signal $q_s$ by 0, the input terminal connected to terminal $p$ is directly connected to the output terminal $c_1$ of the combination stage C. Likewise, for multiplying the binary signal $p_s$ by 0 and the binary signal $q_s$ by 1, the input terminal connected to the output terminal $q$ is directly connected to the output terminal $c_3$ of the combination stage C. For multiplying the binary signal $p_s$ by 1 and the binary signal $q_s$ by 1 the two input terminals are connected to the input terminals of a first or-gate $Oc_1$, the output terminal of which is directly connected to the output terminal $c_2$ of the combination stage C. For multiplying the binary signal $p_s$ by $-1$ and the binary signal $q_s$ by 1 the input terminal connected to terminal $p$ is connected via an inverter to an input terminal of an and-gate EC, the other input terminal of which is connected to the input terminal $6g$ of the correlator $CI_{rr}$. The output terminal of this and-gate is connected to an input terminal of a second or-gate $Oc_2$ and the other input terminal of the combination stage C is directly connected to a second input terminal of the or-gate $Oc_2$. The output terminal of the or-gate is directly connected to the output terminal $c_4$ of the combination stage C. The four output terminals $c_1$ to $c_4$ of the combination stage are connected to the respective inputs of four identical counting devices $TL_1$ to $TL_4$ of the integrating stage I. The counting device $TL_1$ shown in some detail in FIG. 2 comprises a forward and a backward counter $T_1$, which counts forwardly when a pulse is applied to the + input and counts backwardly when a pulse is applied to the − input. The + input is connected to the output terminal of a first and-gate $ET_1$ and the − input is connected to the output terminal of a second and-gate $ET_2$. The output terminal $c_1$ of the combination stage C is directly connected to an input terminal of the and-gate $ET_1$ and via an inverter to an input terminal of the and-gate $ET_2$. The other input terminal of the gate $ET_1$, termed the control-terminal, is connected to the other input terminal (termed control-terminal) of the gate $ET_2$ and is connected to the input terminal $6g$ of the correlator $CI_{xr}$. Likewise the control-terminals of the counting device $TL_2$ and of the counting device $TL_4$ are connected to the input terminal $6f$ of the correlator $CI_{xr}$ and the control-terminals of the counting device $TL_3$ are connected to the input terminal $6e$ of the correlator $CI_{xr}$. The input terminal $6g$ is connected to the output of the and-gate $S_5$ of the control-stage S. An input terminal of the gate $S_5$ is connected to the input terminal K of the control-stage S and a further input terminal is connected to an output terminal 22 of the divide-by-two device $TW_2$. It is thus ensured that the and-gates of the counting device $TL_1$ can deliver a pulse only when they receive a significant signal originating from the binary signals of the multipliers $A_{xr}$ and $B_{xr}$.

In the same manner the input terminal $6e$ is connected to the output terminal of an and-gate $S_6$ of the control-stage S. An input terminal of this gate $S_6$ is connected to the input terminal K of the control-stage S and a further input terminal is connected to the output terminal 21 of the divide-by-two circuit $TW_2$. The counting device $TL_3$ can therefore count only the signal value at the input terminal of this counting device at the instants when the multipliers $A_{xr}$ and $B_{xr}$ deliver a significant signal.

The input terminal $6f$ is directly connected to the input terminal K of the control-stage S. The counting device $TL_n$ and the counting device $TL_4$ can thus count the significant signal values of the bits of the binary signals delivered by all multipliers $A_{xr}$ to $B'_{xr}$ of the multiplying stage V.

It will be obvious that the counting device will be activated by the value of the signal at the input terminals at the instant of reception of a control-pulse. If said value corresponds to "1", the counting device will add and if said value corresponds to "0" the counting device will subtract. Multiplication by "−1" means that, when the sign of the product signal formed by the input signals in the multipliers $A'_{xr}$ and $B'_{xr}$ is positive at the instant of delivery of a control-pulse, this pulse has to be subtracted from the contents of the counting device and conversely. This may be achieved by means of a simple inverter, as is indicated at an input terminal of the and-gate Ec of the combination stage C.

The output terminals of the counting devices $TL_1$ to $TL_4$ of the integrating stage I are connected to the input terminals of a threshold device Dr. This device compares the absolute positions of the counters $T_1$ and $T_3$ with the value D and those of the counters $T_2$ and $T_4$ with a value of $D\sqrt{2}$. The latter threshold is chosen $\sqrt{2}$ times higher due to the $\sqrt{2}$ excess quantity of bits at the output terminals $c_2$ and $c_4$ of the combination stage C. The threshold device Dr delivers a signal at the output terminal $u_7$, when one of the counting devices exceeds the threshold value associated therewith. These threshold values are rounded off to an integral number.

It should be noted that the and-gates of the counting devices may be dispensed with by differently organizing the multipliers $A_{xr}$ to $B'_{xr}$. For this purpose each multiplier has to be provided with two output terminals, one output terminal delivering a pulse when the product signal formed by the input signals at the terminals 7 to 10 is positive and one output terminal U delivering a pulse when the product signal formed by said signals is negative for each kind of output terminal an individual combination device C is then required, which are identical for each pair of output terminals. The counters may then be free running counters, the + inputs of which are connected to one of the combination devices C, the − inputs being connected to the other combination device C.

As an alternative, control-signals may be applied to the counting devices alone without being applied to the multipliers. This requires completely separate paths for the signals emanating from the multipliers.

Figure 4:
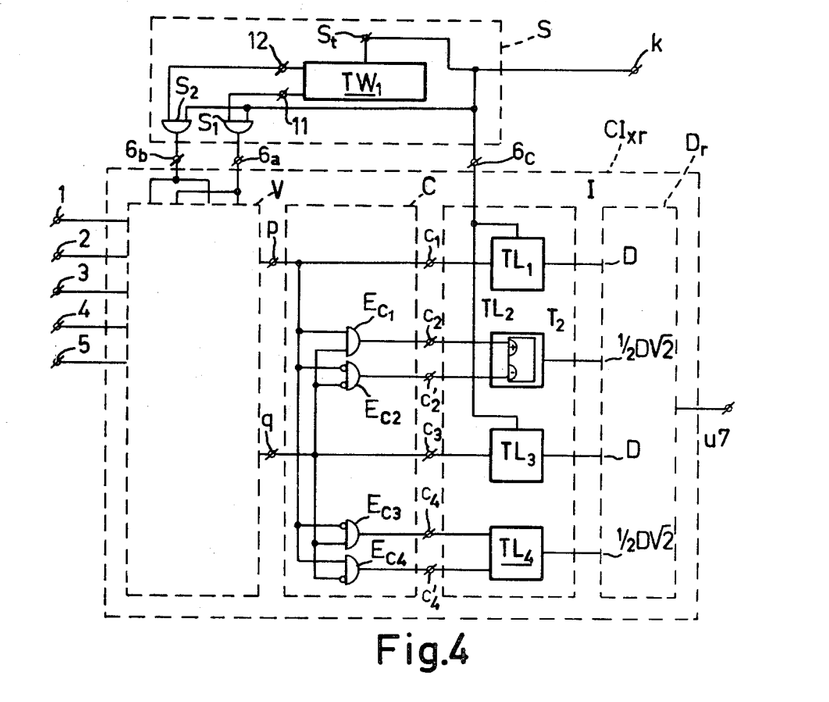
FIG. 4 shows a second embodiment of the correlator in accordance with the invention.

The arrangement shown in FIG. 2 has the disadvantage that the counters of the counting devices $TL_2$ and $TL_4$ have to be suitable for counting a $\sqrt{2}$-times higher value than the counters $TL_1$ and $TL_3$. However, it is possible to divide by two the values to be counted by the counting devices $TL_2$ and $TL_4$. For this purpose the multiplying stage V has to be controlled in a different manner. This embodiment of the arrangement in accordance with the invention is illustrated in FIG. 4. Hereinafter only the differences between the arrangements of FIG. 2 and 4 will be dealt with.

The control-stage S comprises an input terminal K, which is connected to the control-terminal $St$ of a divide-by-two circuit $TW_1$, which has the output terminals 11 and 12. The control-stage comprises, in addition, two and-gates $S_1$ and $S_2$. One of the input terminals of the and-gate $S_1$ is connected to the input terminal K of the control-stage and the other is connected to the output terminal 11 of the divide-by-two circuit $TW_1$. One of the input terminals of the and-gate $S_2$ is connected to the input terminal K of the control-stage and the other input terminal is connected to the output terminal 12 of the divide-by-two circuit $TW_2$. The output terminal of the and-gate $S_1$ is connected to the input terminal $6a$ of the correlator $CI_{xr}$ and the output terminal of the and-gate $S_2$ is connected to the input terminal $6b$ of the correlator $CI_{xr}$. At the terminals $6a$ and $6b$ alternatively appear the pulses of the clock pulse signal applied to the input terminal K of the control-stage S.

The most important difference from the arrangement shown in FIG. 2 consists in that the input terminals 10 of the multipliers $A_{xr}$, $A'_{xr}$ and $B_{xr}$ respectively, $B'_{xr}$ are connected to each other and to the input terminals $6a$ and $6b$ of the correlator $CI_{xr}$. It is thus ensured that the bits of the binary signals $p_s$ and $q_s$ respectively are delivered at the terminals $p$ and $q$ respectively of the multiplying stage V, which is termed parallel processing.

The projections on the four axes are again obtained by means of the multiplication factors indicated in columns 4 and 5 of Table A. The projection on the axis being at an angle $\pi/4$ to the x-axis is detailed in Table B.

TABLE B

| $p_s$ 1 | $q_s$ 1 | to be counted | counting result | Use of and-gates |
|---|---|---|---|---|
| 1 | 1 | 1 + 1 | +2 | 1 |
| 0 | 1 | −1 + 1 | 0 | 0 |
| 1 | 0 | +1 − 1 | 0 | 0 |
| 0 | 0 | −1 − 1 | −2 | −1 |

If the two outputs $p$ and $q$ of the multiplying stage deliver binary signals of high value, $p_s$ and $q_s$ have the values "1". This is indicated in the first line of the columns 1 and 2; there has to be counted "1" + "1", so that as a result the contents of the counter are increased by +2 (see column 4). If at one of the two outputs $p$ and $q$ the binary signal is low, so that $p_s$ or $q_s$ has the value "0", there has to be counted "0" + "1", the result being zero as is indicated on lines 2 and 3 of Table B. If at the two outputs $p$ and $q$ the binary signals are low, the counting result is −2, as is indicated on line 4 of Table B. As is indicated in the last column the measuring results may be divided by 2 so that counters of lower capacity may be employed. This is achieved by using and-gates in the combination stage C of the kind described with reference to FIG. 4.

The output terminals $p$ and $q$ are directly connected to the input terminals of a first and-gate $Ec_1$ and through inverters to the input terminals of a second and-gate $Ec_2$ of the combination stage C. The output terminal of the gate $Ec_1$ is directly connected to the output terminal $c_2$ and the output terminal of the gate $Ec_2$ is directly connected to the output terminal $c_2'$ of the combination stage C. It is thus achieved that only when the two binary signals $p_s$ and $q_s$ are high a pulse is delivered at the output terminal $c_2$ and when the two binary signals $p_s$ and $q_s$ are low, a pulse is delivered at the output terminal $c'_2$. The output terminal $c_2$ is directly connected to the pulse counting input of the counter $T_2$ and the output terminal $c'_2$ is directly connected to the minus-counting input of the counter $T_2$. The counting device $TL_2$ thus comprises only the counter $T_2$. The output of the counter $T_2$ is connected to the threshold device $Dr$, whose required threshold value has to be chosen a factor 2 lower than that indicated in FIG. 2.

In the same manner the arrangement determining the projection on the axis being at an angle of $3\pi/4$ to the $x$-axis can be simplified. The output terminal $p$ of the multiplying stage is connected through an inverter to an input of a third and-gate $Ec_3$ of the combination stage C. The output terminal $q$ is directly connected to the other input terminal of this and-gate. The output terminal of this gate $Ec_3$ is connected to the output terminal $c_4$ of the combination stage C, said output terminal being directly connected to the +−input of the counter $T_4$ of the counting device $TL_4$, which is constructed in the same manner as the counting device $TL_2$. The output terminal $p$ is directly connected to the input terminal of a fourth and-gate $Ec_4$ of the combination stage C. The output terminal $q$ is connected through an inverter to the other input terminal of this gate $Ec_4$. The output terminal of this gate $Ec_4$ is connected to the output terminal $c'_4$ of the combination stage C. The terminal $C'_4$ is directly connected to the minus-input of the counter $T_4$. The output terminal of this counter is connected to the threshold device $Dr$, whose threshold value required for this counter has to be chosen a factor 2 lower than that shown in FIG. 2. The arrangement of the further axes has not been changed, only the control-terminals of the counters $T_1$ and $T_3$ are connected to the input terminal $6c$ of the correlator $CI_{xr}$, said input terminal being connected to the input terminal K of the control-stage S.

The parallel process has the advantage that counters of lower counting capacity will suffice, the and-gates of some counters may be omitted, the control-stage S of the correlators CI is simple and the counting rate may be doubled. This double counting rate increases the permissible bandwidth of the signals to be correlated. The accuracy of a four-axes system as compared with the known result obtained by squaring is illustrated in FIG. 5 in a vector diagram.

The four axes being at an angle of 0, $\pi/4$, $\pi/2$ and $3\pi/4$ respectively to the $x$-axis are designated in the Figure by $a_1$ to $a_4$. An input signal R having a phase angle $\phi$ is also represented.

It is supposed that, if the correlation result provides a value exceeding a given threshold value D it is stated with great certainty that this result originates from the reflection of an object and is not provided only by the summation of noise.

Figure 5:
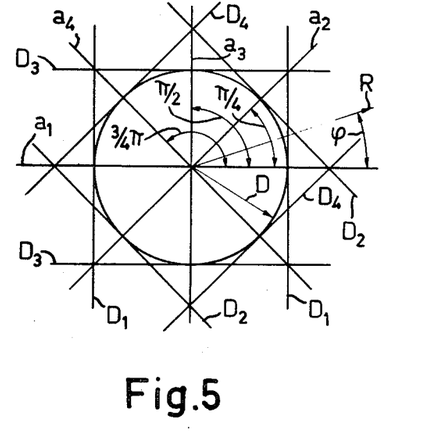
FIG. 5 is a graph of the accuracy of the threshold approximation.
Figure 6:
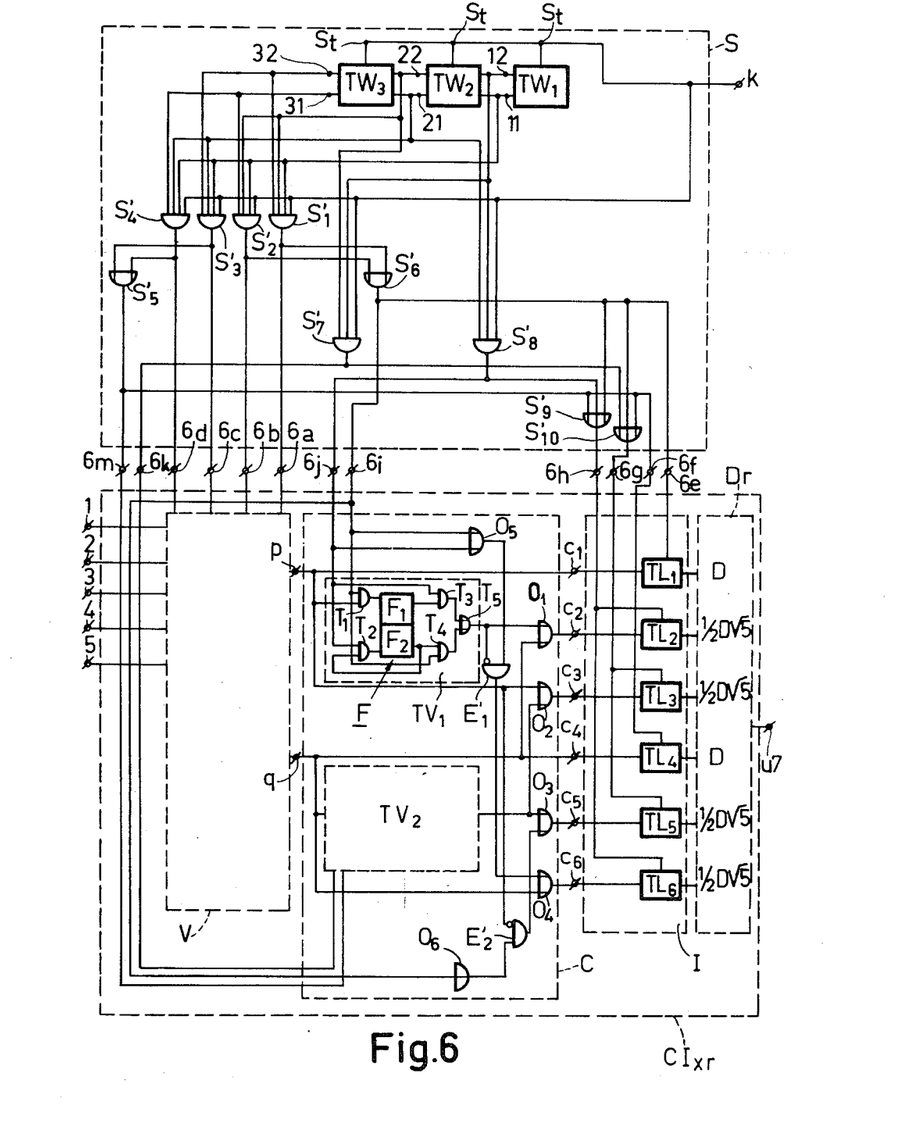
FIG. 6 shows a third embodiment of a correlator in accordance with the invention.

The threshold value D is represented in FIG. 5 by a circle of a radius D. The threshold values of the threshold device $Dr$ of FIGS. 2 and 4 are represented in this Figure by the lines $D_1$ to $D_4$. It should be noted that the threshold device compares both a positive and a negative counting result with the same absolute threshold value. From FIG. 5 it will be apparent that the desired threshold circle may be represented by approximation by an external regular octagon. A better approximation is obtained by a regular polygon having $2n$ angles by using $n$ axes in a regular array over $2\pi$. By using a plurality of axes, in most cases $\sin 2\pi j/n$ and $\cos 2\pi j/n$ can be approached only by fractions, the numerators $u_j$ and $v_j$ of which are large numbers because the exact values of the sine and the cosine result in roots in the numerators of the fractions. However, high values of $u_j$ and $v_j$ require devices comprising counters of very high counting capacity, which is expensive. The invention obviates this disadvantage by using an axis system not completely regularly distributed over $2\pi°$. This is illustrated by an embodiment as shown in FIG. 6. This embodiment comprises a six-axes system with serial processing. Hereinafter only the differences between the arrangements of FIG. 2 and 4 will be dealt with. The control-stage S comprises three divide-by-two circuits $TW_1$ to $TW_3$. The input terminal K of the control-stage is connected to the control-terminals $St$ of all divide-by-two circuits $TW_1$ to $TW_3$. The divide-by-two circuit $TW_1$ comprises output terminals 11 and 12, which are connected to the input terminals of the divide-by-two circuit $TW_2$ having output terminals 21 and 22. The output terminals 21 and 22 are connected to the input terminals of the divide-by-two circuit $TW_3$ having output terminals 31 and 32. Four and-gates $S'_1$ to $S'_4$ are provided, each having four input terminals. The first input terminal of gate $S'_1$ is connected to the input terminal K of the control-stage. The second input terminal is connected to the output terminal 11; the third input terminal is connected to the output terminal 22 and the fourth input terminal is connected to the output terminal 32. The input terminals of the gate $S'_2$ are connected in the same manner to the input terminals $K_1$, the output terminal 11, the output terminal 21 and the output terminal 31. The input terminals of the gate $S'_3$ are connected likewise to the input terminal K, the output terminal 11, the output terminal 21 and the output terminal 32 and the input terminals of the gate $S'_4$ are connected in the same manner to the input terminal K, the output terminal 11, the output terminal 21 and the output terminal 31. Each of the outputs of these gates is connected to a separate one of the input terminals 6a to 6e of the correlator $CI_{xr}$. Each of the input terminals 6a to 6e is connected to a separate control-terminal 10 of the multipliers $A_{xr}$, $B_{xr}$, $A'_{xr}$ and $B'_{xr}$ (not shown). For this purpose the multipliers $A_{xr}$ and $B_{xr}$ can deliver a signal at the output terminal p of the multiplying stage V at the instants of appearance of the $(1 + 8n)^{th}$ pulse and the $(5 + 8n)^{th}$ pulse of the clock signals applied to the input terminal K of the control-stage S ($n = 1, 2, 3, \ldots$). Likewise the multipliers $A'_{xr}$ and $B'_{xr}$ are adapted to deliver a signal at the output terminal q of the multiplying device V at the instants of appearance of the $(3 + 8n)^{th}$ pulse and the $(7 + 8n)^{th}$ pulse of the pulse sequence applied to the input terminal K of the control-stage S ($n = 1, 2, \ldots$).

The multiplying factors of this six-axes system are indicated for the binary signals $p_s$ and $q_s$ in Table C.

TABLE C

| $\psi$ | $\cos \psi$ | $\sin \psi$ | Mult. factor $p_s$ | Mult. factor $q_s$ | Threshold values |
|---|---|---|---|---|---|
| 0 | 1 | 0 | 1 | 0 | $D\sqrt{5}$ |
| $\pi/6$ | $\frac{1}{2}\sqrt{3}$ | $\frac{1}{2}$ | 2 | 1 | $D\sqrt{5}$ |
| $\pi/3$ | $\frac{1}{2}$ | $\frac{1}{2}\sqrt{3}$ | 1 | 2 | $D\sqrt{5}$ |
| $\pi/2$ | 0 | 1 | 0 | 1 | $D\sqrt{5}$ |
| $2\pi/3$ | $-\frac{1}{2}$ | $\frac{1}{2}\sqrt{3}$ | $-1$ | 2 | $D\sqrt{5}$ |
| $5\pi/6$ | $-\frac{1}{2}\sqrt{3}$ | $\frac{1}{2}$ | $-2$ | 1 | $D\sqrt{5}$ |

The angles between the axes and the x-axis are indicated in column 1. Columns 2 and 3 indicate the exact values of the cosine and sine multiplication factors.

Because $\sqrt{3}$ is not appropriate for digital processing and in order to avoid processing with multi-decimal numbers as an accurate approximation of $\sqrt{3}$, which requires devices having counters of high counting capacity, $\sqrt{3}$ is approximately represented by the nearest integral number, that is to say 2. Columns 4 and 5 of Table C indicate the multiplication factors, for which this approximation is used, for the binary signals $p_s$ and $q_s$. Column 6 indicates the associated threshold values. Owing to the approximation the axes are at angles of 26° 30' and 63° 30' respectively to the -axis instead of being at angles of 30° and 60° respectively.

The arrangement of the combination stage of this six-axes system is represented in the block C. The output terminal p is directly connected to the output terminal $c_1$ of the combination stage C. Likewise the output terminal q is directly connected to the output terminal $c_4$ of the combination stage C in order to obtain a multiplication of the binary signals $p_s$ and $q_s$ by a factor 1.

The combination stage C comprises two identical multiplying devices $TV_1$ and $TV_2$. Such a multiplier, which has to multiply the number of bits of the binary signals by 2, comprises a storage element F and four and-gates $T_1$ to $T_4$. The storage element is a bistable circuit F. The inputs thereof are connected to the output terminals of the and-gates $T_1$ and $T_2$. The output terminals of the bistable circuit F are connected to the input terminals of the and-gates $T_3$ and $T_4$. The input terminal of the gate $T_1$ is connected to the terminal p of the multiplying stage V and the other input terminal is connected to the input terminal 6i of the correlator $CI_{xr}$. An input terminal of gate $T_2$ is connected to the output terminal of the portion $F_2$ of the bistable circuit F and the other input terminal is connected to the input terminal 6j of the correlator $CI_{xr}$. The other input terminal of the gate $T_3$ is connected to the input terminal 6j and the other input terminal of the gate $T_4$ is connected to the input terminal 6i of the correlator $CI_{xr}$. The output terminals of the and-gates $T_3$ and $T_4$ are connected to the input terminals of an or-gate $T_5$. The input terminal 6i of the correlator $CI_{xr}$ is connected to the output terminal of an or-gate $S'_6$ of the control-stage S. An input terminal of the gate $S'_6$ is connected to the output terminal of the and-gate $S'_1$. A further input terminal is connected to the output terminal of the and-gate $S'_2$. The input terminal 6j of the correlator $CI_{xr}$ is connected to the output terminal of the and-gate $S'_8$ of the control-stage S, of which a input terminal is connected to the input terminal K of the control-stage S and a further input terminal is connected to the output terminal 12 of divide-by-two circuit $TW_1$ a third input terminal being connected to the output terminal 21 of the divide-by-two circuit $TW_2$. It is thus ensured that at the instants of appearance of the $(1 + 4n)^{th}$ pulse ($n = 1, 2, 3 \ldots$) of the clock pulse sequence applied to the input terminal K of the control-stage these pulses are applied to the input terminal 6i of the correlator and at the instants of appearance of the $(2 + 4n)^{th}$ pulses ($n = 1, 2, 3 \ldots$) of the clock pulse sequence applied to the input terminal K of the control-stage these pulses are applied to the input terminal 6j of the correlator. The operation is as follows: At the instants of appearance of the $(1 + 4n)^{th}$ pulses a pulse is delivered or not delivered at the terminal p of the multiplying stage in accordance with the sign of the product signal, which pulse is applied together with the pulse at the terminal 6i of the and-gate $T_1$ of the multiplier $TV_1$. This will transfer the signal value at the output terminal of the gate $T_1$ to the input of portion $F_1$ of the bistable circuit F. Thus the output of the portion $F_2$ of the bistable circuit F will take over said value. This signal value of the output terminal of $F_2$, together with the pulse at the input terminal 6i, is applied to the and-gate $T_4$, which transfers said value to an or-gate $T_5$. This value of the signal at the output of $F_2$ is, moreover, applied to the input terminal of the and-gate $I_2$. At the instant of appearance of the $(2 + 4n)^{th}$ pulses a pulse is supplied at the other input terminal of the gate $T_2$. The input value of the signal at the first input terminal of gate $T_2$ is then applied to the input terminal of $F_2$. The output of the portion $F_1$ will take over this signal value. The signal value at the output of $F_1$, together with the pulse at the input terminal 6j, is transferred to the and-gate $T_3$. This and-gate passes the signal value to an input terminal of the or-gate $T_5$. Because the output terminals of the and-gates $T_3$ and $T_4$ are never equally "high," the or-gate $T_5$ will pass the signal values at said instants.

The arrangement of the second multiplier $TV_2$ is identical. However, this multiplier receives other pulses from the control-stage, i.e. via the input terminals $6m$ and $6k$ of the correlator.

The input terminal $6m$ is connected to the output terminal of the or-gate $S'_5$ of the control-state. A first input terminal of said gate is connected to an output of the and-gate $S'_4$ and a second input terminal is connected to the output of $S'_3$. Thus terminal $6m$ receives the $(3+4n)^{th}$ pulses ($n = 1, 2, ..$) of the clock pulse sequence applied to the input terminal K of the control-stage.

The input terminal $6k$ is connected to the output of the and-gate $S'_7$ of the control-stage S. A first input terminal of this gate is connected to the input terminal K and a second input terminal is connected to the terminal 12 of the divide-by-two circuit $TW_1$ and a third input terminal is connected to the output terminal 22 of the divide-by-two circuit TW of the control-stage S. Thus the $(4 + 4n)^{th}$ pulses ($n = 1, 2, ..$) of the clock pulse sequence applied to the input terminal K are delivered at terminal $6K$.

By this control the multiplier $TV_2$ will deliver at its output terminal the signal value at the instants of appearance of the $(3 + 4n)^{th}$ pulses of the clock pulse sequence at terminal $q$ of the multiplier V at the instants coinciding with the $(3 + 4n)^{th}$ and the $(4 + 4n)^{th}$ pulses ($n = 1, 2, ..$) of the clock pulse sequence.

The output terminal of the multiplier $TV_1$ is connected to a first input terminal of an or-gate $O_1$ and through an inverter to a first input terminal of an and-gate $E'_1$, the other input terminal of which is connected to the output terminal of an or-gate $O_5$. A first input terminal of this or-gate is connected to the input terminal $6i$ and the other input terminal of the or-gate $O_5$ is connected to the input terminal $6j$ of the correlator $Cl_{rr}$. The output terminal of the and-gate $E'_1$ is connected to a first input terminal of the or-gate $O_4$. The output terminal of the multiplier $TV_2$ is connected to a first input terminal of an or-gate $O_2$ and to a first input terminal of an or-gate $O_3$. The output terminal $p$ of the multiplying stage V is connected to the other input terminal of the or-gate $O_2$ and via an inverter to an input terminal of the and-gate $E'_2$, the other input terminal of which is connected to the output terminal of an or-gate $O_6$. The input terminal of this or-gate $O_6$ is connected to the input terminal $6k$ and a further input terminal of this gate is connected to the input terminal $6m$ of the correlator $Cl_{rr}$. The output terminal of the and-gate $E'_2$ is connected to the other input terminal of the or-gate $O_3$. The output terminal $q$ of the multiplying stage V is connected to the other input terminal of the or-gate $O_1$ and of the or-gate $O_4$. The output of the or-gate $O_1$ is connected to the output terminal $c_2$ of the combination stage C. The output terminal of the gate $O_2$ is connected to terminal $c_3$, the output terminal of gate $O_3$ is connected to terminal $c_5$ and the output terminal of $O_4$ is connected to the terminal $c_6$ of the combination stage C.

The bits appearing at the output terminals $c_1$ to $c_6$ are composed of the products of the factors indicated in the columns 4 and 5 of Table C for the binary signals $p_s$ and $q_s$.

The terminals $c_1$ to $c_6$ are connected to individual counting devices $TL_1$ to $TL_6$ of the integrating stage I.

The significant signals appearing at the input of the counter $TL_1$ coincide with the $(1 + 4n)^{th}$ pulses of the clock pulse sequence applied to the input terminal K of the control-stage S. The control-terminal of the counting device $TL_1$ is connected for this purpose to the input terminal $6e$, which is connected to the output terminal of the or-gate $S'_6$, which delivers these pulses at said instants. The significant signals appearing at the input of the counters $TL_2$, $TL_6$ coincide with the $(1 + 4n)^{th}$ pulse, the $(2 + 4n)^{th}$ pulse and the $(3 + 4n)^{th}$ pulse ($n = 1, 2, ..$) of the clock pulse sequence applied to the input terminal K of the control stage S. The control-terminals of the counters $TL_2$ and $TL_6$ are connected for this purpose to the input terminal $6h$. This input terminal is connected to the output terminal of the or-gate $S'_9$. An input terminal of this gate $S'_9$ is connected to the output terminal of the or-gate $S'_5$, a further input terminal is connected to the output terminal of the gate $S'_6$ and a third input terminal is connected to the output terminal of the and-gate $S'_8$, so that at said instants pulses are delivered at the input terminal $6h$.

The significant signals appearing at the input of the counter $TL_3$ and of the counters $TL_5$ coincide with the $(1 + 4n)^{th}$, the $(3 + 4n)^{th}$ and the $(4 + 4n)^{th}$ pulses ($n = 1, 2, ..$) of the clock pulse sequence applied to the input terminal K of the control-stage S. The control-terminals of the counters $TL_3$ and $TL_5$ are connected for this purpose to the input terminal $6g$. This input terminal is connected to the output terminal of the or-gate $S'_{10}$. An input terminal of this gate $S'_{10}$ is connected to the output terminal of the or-gate $S'_8$, a second input terminal is connected to the output terminal of the or-gate $S'_6$ and a third input terminal is connected to the output terminal of the and-gate $S'_7$, so that at said instants pulses are delivered at the input terminal $6g$.

The significant signals appearing at the input of the counter $TL_4$ coincide with the $(3 + 4n)^{th}$ pulses of the clock pulse sequence applied to the input terminal K of the control-stage S. The control-terminal of the counter $TL_4$ is connected for this purpose to the input terminal $6f$, which is connected to the output terminal of the or-gate $S'_5$, which delivers said pulses at said instants. The threshold of the threshold device Dr are, in connection with the corrections formed by the term $\sqrt{u_j^2 + v_j^2}$ for the six counters in order of succession D, D $\sqrt{5}$, D $\sqrt{5}$, D, D $\sqrt{5}$ and D $\sqrt{5}$.

What is claimed is:

1. A phase independent digital correlator comprising signal input means for receiving digital signals, circuit means comprising at least one pair of 90° phase-shifted multiplying devices coupled to said signal input means for forming products of the digital signals, a plurality of combination devices coupled to said multiplying means for forming linear combinations of said product signals, the coefficients of the linear combination formed by the $i^{th}$ combination device ($i=1,2,3, ... n$) being integral numbers, said integral numbers being the numerators of two fractions having equal denominators, said fractions being approximately $\cos 2\pi i/n$ and $\sin 2\pi i/n$, integrating circuit means comprising a plurality of integrating devices for determining the values of the linear combinations of said product signals, each integrating device being connected to a separate signal combination device, threshold circuit means comprising a plurality of inputs, each of said inputs being connected to a separate integrating device for correcting the value of the linear combination of the product signals, said threshold circuit means having a threshold value at the corresponding $i^{th}$ input equal to a constant value of all inputs multiplied by the denominator of said fractions, and signal output means coupled to said threshold circuit means for providing an output signal proportional to the amplitudes of said digital signals.

2. A phase independent correlator as claimed in claim 1, wherein said 90° phase-shifted multiplying device comprises and-gates and inverters.

3. A phase independent correlator as claimed in claim 1, wherein said signal combination device comprises and-gates and bistable circuits.

4. A phase independent correlator as claimed in claim 1, wherein each integrating device comprises a counter.

* * * * *